US011346388B2

(12) United States Patent
Dissing (10) Patent No.: US 11,346,388 B2
(45) Date of Patent: May 31, 2022

(54) SCREW WITH TAPERED SCREW-HEAD, USE OF A SCREW AND A METHOD FOR COUNTERSINKING THE SCREW

(71) Applicant: Dissing A/S, Skanderborg (DK)

(72) Inventor: Claus Hornstrup Dissing, Ry (DK)

(73) Assignee: Dissing A/S, Skanderborg (DK)

( * ) Notice: Subject to any disclaimer, the term of this patent is extended or adjusted under 35 U.S.C. 154(b) by 84 days.

(21) Appl. No.: 16/760,503

(22) PCT Filed: Oct. 31, 2018

(86) PCT No.: PCT/DK2018/050276
§ 371 (c)(1),
(2) Date: Apr. 30, 2020

(87) PCT Pub. No.: WO2019/086091
PCT Pub. Date: May 9, 2019

(65) Prior Publication Data
US 2021/0372457 A1 Dec. 2, 2021

Related U.S. Application Data

(60) Provisional application No. 62/580,016, filed on Nov. 1, 2017.

(30) Foreign Application Priority Data

Nov. 1, 2017 (DK) .............................. PA 2017 70817

(51) Int. Cl.
*F16B 35/06* (2006.01)
*F16B 25/00* (2006.01)

(52) U.S. Cl.
CPC ........ *F16B 35/065* (2013.01); *F16B 25/0015* (2013.01); *F16B 25/0057* (2013.01)

(58) Field of Classification Search
CPC ........................... F16B 25/0015; F16B 35/065
USPC .......................................................... 411/399
See application file for complete search history.

(56) References Cited

U.S. PATENT DOCUMENTS

| 466,463 | A | * | 1/1892 | Holland | ................ | F16B 35/065 |
| | | | | | | 411/188 |
| 586,232 | A | * | 7/1897 | English | ................ | F16B 33/004 |
| | | | | | | 411/188 |
| 1,151,861 | A | * | 8/1915 | Brumback | ............. | F16B 35/06 |
| | | | | | | 411/399 |
| 1,175,665 | A | * | 3/1916 | Sweet | ................... | F16B 35/065 |
| | | | | | | 411/403 |
| 5,199,839 | A | * | 4/1993 | DeHaitre | ............ | F16B 23/0076 |
| | | | | | | 411/387.3 |

(Continued)

FOREIGN PATENT DOCUMENTS

| CN | 1264795 A | 8/2000 |
| CN | 101498334 A | 8/2009 |

(Continued)

*Primary Examiner* — Gary W Estremsky
(74) *Attorney, Agent, or Firm* — James Creighton Wray (57) ABSTRACT

In order to prevent wood fringes at the edge of a hole from a countersunk screw (1), the screw-head (2) is provided with a tapering underside and inclined milling-ribs (8) on the tapering underside. Each milling-rib (8) has a planar front-side (15) delimited by smoothly curved convex milling-edge (17) for milling the material during countersinking of the screw-head (2).

10 Claims, 11 Drawing Sheets

(56) References Cited

U.S. PATENT DOCUMENTS

| | | | | |
|---|---|---|---|---|
| 5,203,657 A | * | 4/1993 | Nagoshi | F16B 35/065 411/188 |
| 5,205,694 A | * | 4/1993 | Nagoshi | F16B 23/0023 411/399 |
| 5,516,248 A | * | 5/1996 | DeHaitre | F16B 23/0015 411/387.2 |
| 6,290,444 B1 | | 9/2001 | Dicke | |
| 6,394,725 B1 | * | 5/2002 | Dicke | F16B 35/065 411/188 |
| 7,293,947 B2 | * | 11/2007 | Craven | F16B 35/048 411/387.2 |
| 7,329,077 B2 | * | 2/2008 | Curtis | F16B 33/004 411/188 |
| 7,604,445 B1 | * | 10/2009 | Dicke | F16B 35/065 411/188 |
| D708,509 S | | 7/2014 | Lin | |

FOREIGN PATENT DOCUMENTS

| | | |
|---|---|---|
| CN | 102439323 A | 5/2012 |
| CN | 103047245 A | 4/2013 |
| DE | 3344048 A1 | 6/1984 |
| DE | 9106746 U1 | 7/1991 |
| EP | 0705987 A1 | 4/1996 |
| EP | 1182367 A2 | 2/2002 |
| EP | 22522865 A1 | 11/2012 |
| EP | 2846053 A1 | 3/2015 |
| EP | 3002468 A1 | 4/2016 |
| GB | 190615102 A | 10/1906 |
| GB | 972653 A | 10/1964 |
| GB | 2227540 A | 8/1990 |
| GB | 2336415 A | 10/1999 |
| TW | 201422932 A | 6/2014 |

\* cited by examiner

FIG. 7a (prior art from EP3067575A1)

FIG. 7b (prior art from EP3067575A1)

FIG. 7c (prior art from EP3067575A1)

FIG. 7d (prior art from EP3067575A1)

SCREW WITH TAPERED SCREW-HEAD, USE OF A SCREW AND A METHOD FOR COUNTERSINKING THE SCREW

This application claims the benefit of Danish Application No. PA 2017 70817 filed Nov. 1, 2017, U.S. Provisional Application No. 62/580,016 filed Nov. 1, 2017 and PCT/DK2018/050276 filed Oct. 31, 2018, International Publication No. WO 2019/086091 A1, which are hereby incorporated by reference in their entirety as if fully set forth herein.

The present invention relates to a screw, especially a wood-screw, according to the introductory part of the claims, wherein the underside of the screw-head comprises a tapered surface with a plurality of milling-ribs that are inclined for pressing milled material inwards towards the shank during countersinking of the screw.

BACKGROUND OF THE INVENTION

For a proper and smooth countersinking of a screw-head into a material, it is common practice to provide the underside of the screw-head with serrations, for example milling-ribs. The milling-ribs are often oriented such that they are lying in a plane that also contains the central axis of the screw. In other cases, they are inclined to such plane. In even further cases, serrations are curved, for example along a spiral path or S-curved. Examples of these various shapes are disclosed in German publication DE3344048A1, German utility model DE9106746U1, European patent applications EP0705987, EP1182367, EP2522865, French patent application FR2784722, British patent applications GB2227540, GB972653, GB2336415, U.S. Pat. Nos. 586,232, 1,151,861, 5,199,839, 7,293,947, U.S. D708509, and Chinese patent application CN101498334A.

In all of the above prior art, the inclined milling-ribs are outwards-pressing in the sense that the material that is milled by the milling-ribs is pressed in an outwards direction as seen from the screw shank.

For better understanding, the term "outwards-pressing milling-ribs" is used herein for skew milling-ribs by which material is pressed outwards during countersinking of the screw into the material. Similarly, the term "inwards-pressing milling-ribs" is used for skew milling-ribs by which material is pressed inwards towards the shank during countersinking of the screw into the material. Inward-pressing milling-ribs have a front-side that is inclined by an angle in the direction of the screwing-in direction of the screw relatively to a cross-sectional plane that contains the central axis of the screw and which crosses the front-side nearest to the shank. Outward-pressing milling-ribs have a front-side that is inclined by an angle opposite to the screwing-in direction of the screw, when the angle is measured relatively to a cross-sectional plane that contains the central axis of the screw and which crosses the front-side nearest to the shank.

The term "front-side" of the milling-rib is used herein for the side of the milling-rib that is pushed against the material when the screw during rotation is countersunk into the material. The term "back side" is the opposite side of the milling-rib relatively to the front-side.

Figure 7A:
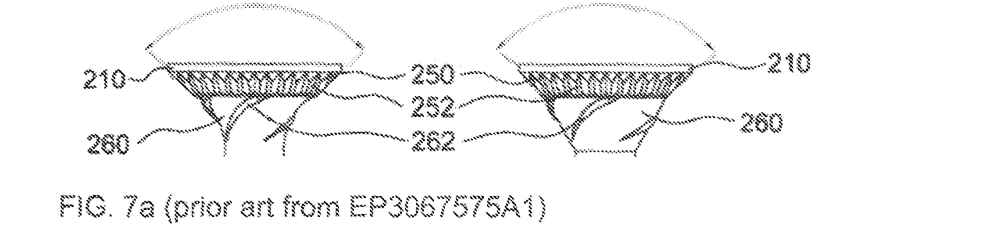
FIGS. 7a to 7d are copied portions from prior art illustrations in EP3067575A1, where a) illustrates outwards-pressing milling-ribs, b) inwards pressing milling-ribs, c) a detailed view of inwards-pressing milling-ribs in side view and d) in cross-section.
Figure 7B:
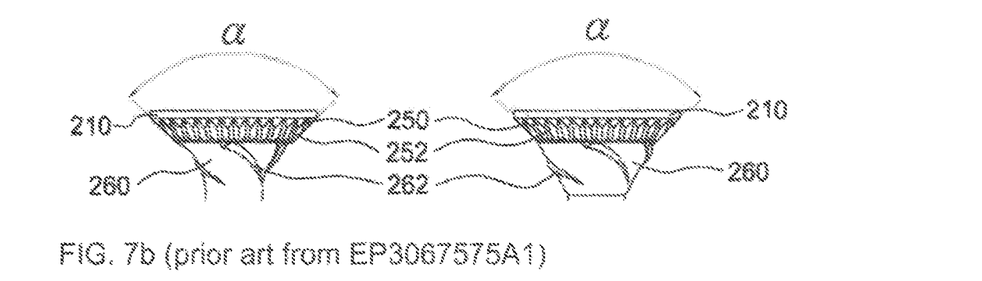

The two different principles are illustrated in FIG. 7a, in which the screw has outwards-pressing milling-ribs 262 by which wood is pressed outwards during clockwise-rotational countersinking of the screw, and FIG. 7b, in which the screw has inwards-pressing milling-ribs 262 by which wood is pressed inwards towards the shank during clockwise-rotational countersinking. Both drawings in FIG. 7a and FIG. 7b are copies from EP3067575A1 by Kwantex.

This European patent application EP3067575A1 differs from the other above-mentioned prior art documents remarkably in that it discloses not only outwards-pressing but also inwards-pressing milling-ribs that are arranged in an incline orientation that causes the wood to be forced towards the shank during countersinking.

Figure 7C:
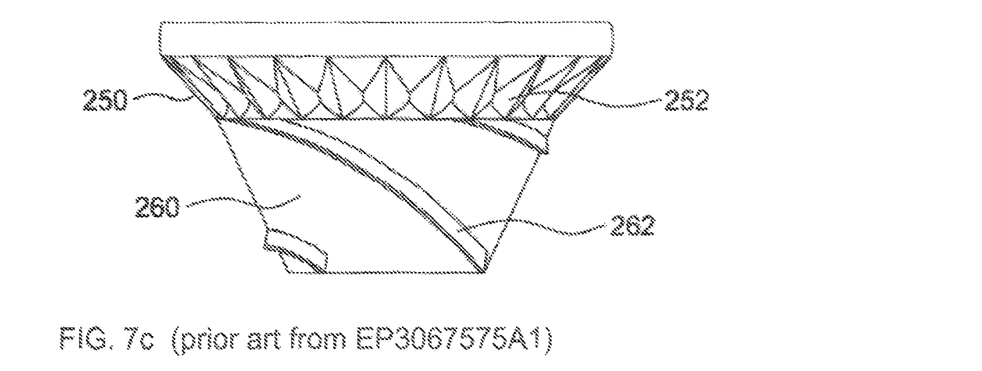
Figure 7D:
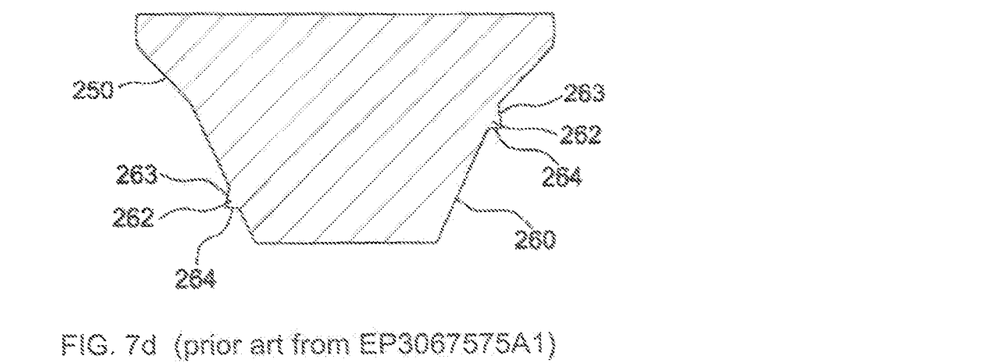

The drawings FIG. 7a and FIG. 7b illustrate a spirally curved milling-edge on the front-side of the milling-ribs. For more detailed illustration of the spiral milling-ribs of the prior art EP3067575A1, FIG. 7c and FIG. 7d show that the inwards-pressing milling-ribs 262 have a front-side 264 of the milling-rib 262 that does not vary in thickness along the milling-rib 262 but has a constant width.

GB15102 discloses a screw with straight milling edges integrated in the underside of the head. The milling edges are formed by cavities inside the surface of the conical underside and are angled such that the milled wood is pressed inwards towards the stem. The countersunk hole formed by this screw is conical. It is emphasized in this disclosure for the milling edges that "in no case do they come out at the face of the head". This integration in the head as cavities is done in order to retain strength and have the appearance as an ordinary screw.

In contrast to cavities that form ribs inside the head, EP3022468 discloses ribs that protrude from the conical surface. The ribs are curved helically and offset and also pressing the wood inwards towards the stem during countersinking. The curving of the ribs is such that the edges are tangential and parallel to the rotational direction when the ribs start engaging with the wood surface during countersinking, so that the initial action is rather cutting than milling during the first phase of the countersinking. Only during further countersinking, when other parts of the ribs engage with the wood, the angle gradually deviates from a tangential direction and the initial cutting of the wood surface is followed by a milling action. During continued countersinking, deeper layers of the wood are first cut and then milled by the curve ribs.

For a proper countersinking, even small variations in the shape of the screw-head and the milling-ribs can have substantial effect. For example, the effect of the screw-head shape and the shape of the milling-ribs may result in the countersunk hole to appear clean or may result in broken wood fibers as fringes around the hole, which is not desired.

DESCRIPTION OF THE INVENTION

It is the objective of the invention to provide an improvement in the art. In particular, it is an objective to provide a screw with improved capabilities for countersinking in a material, in particular in wood. This is achieved with a screw as described in more detail in the following.

The screw comprises a screw-head at a first end of the screw and a shank extending from the screw-head towards an opposite, second end of the screw. A thread is provided on the shank for screwing the screw into a material by a fastening-tool. The screw has a longitudinal central axis extending between the first end and the second end. The screw-head has an upper side and an underside, wherein the upper side comprises a tool-receiver for engagement with the fastening-tool. The underside of the screw-head has a tapered surface, for example frusto-conical, with a taper-direction towards the shank. The taper-direction is defined in a plane that contains the central axis, and, thus, is parallel with the central axis and extends through the center of the screw. The tapered surface is provided with a plurality of milling-ribs. Each of the milling-ribs comprises a front-side that is oriented towards a milling direction and delimited by a milling-edge for milling material during countersinking of the screw-head.

The front-side is inclined relatively to the taper-direction. The inclination of the front-side and the milling-edge is oriented such that the milling-rib is inward-pressing milled material towards the shank during countersinking of the screw-head in the material. The term inward-pressing was explained in more detail in the introduction above.

In contrast to the above-mentioned European patent application EP3067575A1 by Kwantex, the milling-ribs do not have a spiral front-side and cutting-edge, but each milling-rib has a planar front-side, wherein the front-side comprises a sharp milling-edge for cutting the material during countersinking of the screw-head. It has been shown in practice that the flat and straight planar front-side of the milling-ribs results in an improved efficient and aggressive cutting of the wood fibers during countersinking. The planar front-side has turned out to be by far more efficient than rounded ones, for example as the scallop-formed serrations disclosed in U.S. Pat. No. 5,199,839.

Advantageously, the sharp milling-edge of the planar front-side is smoothly and continuously convex curving between opposite ends of the front-side for varying width of the front-side, the width of the front-side being narrowest at the ends. This contributes to a good cutting result. The curving milling-edge is advantageous relatively to the straight edges of EP0705987. The result is a curved countersunk hole.

The combination of a planar front-side and the inclined orientation thereof that is inward-milling has revealed surprising results when used in practice, especially if the milling-edge of the planar front-side is smoothly and continuously convex curving between opposite ends of the front-side. On the one hand, the planar front-side with the cutting-edge is aggressively efficient when countersinking the screw-head into a material, for example wood. On the other hand, due to the planar front-side being oriented such that the milled material is pressed inwards towards the shank, an efficient stopping of the screw in the countersunk hole is achieved despite the aggressive milling. This is understood by the following. The milled material is accumulated in the countersunk hole and compressed therein due to the inwards pressing of the material. During this compression, a layer of the compact material is gradually formed on the tapering underside of the screw-head and accumulated between the milling-ribs during countersinking until the space between the milling-ribs is so filled with compacted material that the milling-ribs are prevented from further milling. The result is a proper stopping of the screw as soon as the screw-head is countersunk into the material. In addition, the screw has a high tightening force against an underlying sub-structure when a piece of material, for example a wood element, such as timber, is screwed against such sub-structure, for example a second wood element, such as a beam.

For this reason, the planar front-side and the inclined orientation thereof that is inward-milling has a surprising positive synergistic effect.

In some embodiments, the planar front-side is widest at a center of the front-side and smoothly and continuously decreasing from the center towards the opposite ends. This way, the front-side of the milling-rib is thickest in the middle and gets narrow towards the first end and towards the shank.

The milling-edge can be smoothly curving in different ways. For example, the milling-edge, when projected onto a plane that extends along the central axis and through the center of the flat surface, follows a section of a circle, which results in a partly-spherical hole for the screw-head during countersinking. For example, such circular section ends with a tangent parallel with the central axis, in which case, the milling results in a hemi-spherical hole for the screw-head during countersinking. Alternatively, the milling-edge in such projection deviates from a section of a circle, for example has a shape of a parabola. The countersunk hole is also rounded in this case.

In some embodiments, the front-side has opposite ends and a center between the opposite ends, wherein the center forms a right angle with the tapering surface in a plane perpendicular to the central axis and through the center of the flat surface. As will be shown below, in some embodiments, the milling-rib can be oriented such that the center is aligned with the central axis when viewed along the planar front-side in a direction perpendicular to the central axis.

In some embodiments, each milling-rib also has a back side that has a larger angle with the tapering surface than the front-side.

In some embodiments, a flat edge is formed on an underside of the screw-head along a rim of the screw-head. For example, the flat edge is connecting the rim with the tapered surface. Such edge assists in cutting wood fibers at the edge of the countersunk hole.

In some embodiment, the flat edge has a surface in a plane perpendicular to the central axis. In some cases, the width of the flat edge, as measured from the rim of the screw-head, is in the range of 1-25% of the diameter of the screw-head, for example 1-5% of the diameter. Optionally, along the rim of the screw-head, alternatively or in addition to the flat edge, there is provided a collar extending a distance towards the second end, the distance typically being in the range of 1-5 mm. Such collar makes the cutting of wood fibers at the edge of the countersunk hole more efficient. As a further alternative, the flat edge is tapering from the rim inwards in order to provide a sharp cutting-edge at the rim, which cutting-edge is directed towards the second end.

When countersinking the screw, it has been experienced that wooden fringes around the countersunk screw are minimized and much less than when using similar prior art screws.

In order to cut or drill its way into the material, advantageously, the screw comprises a cutting-edge in a longitudinal direction of the screw along the front part of the thread. The front part is at the second end of the screw.

In order to reduce drag on the screw, optionally, the screw comprises a knurled shoulder between the thread and the head. Typically, the knurls are provided in direct extension of the thread. For example, the knurled shoulder is provided at a distance to the head, optionally at a distance corresponding to between 1 and 40% of the total length of the screw.

Although, such screw can be used for various materials, the screw is especially useful for screwing into wood.

A typical overall length L of the screw is in the range 10-1000 mm, although, it can also be longer.

The thread corresponds typically to a length of at least 10% of L.

If knurls are provided, these are typically over a range of 1-40% of L.

Typical values for the tapering angle are 20°-60° with the longitudinal axis. Thus, the tapered area, for example frusto-conical area, spans 40°-120° in total Typically, the tapered surface at the underside of the head is frusto-conical. However, a more rounded surface would also be possible, for example convex tapered surface, including an ellipsoidal or semispherical surface or concavely tapered surfaces. Typically, the tapered surface is a solid of revolution, although, this is not strictly necessary. For example, the tapered surface has a non-circular cross-section in a plane perpendicular to the central axis.

BRIEF DESCRIPTION OF THE DRAWINGS

The invention will be described in more detail with reference to the drawings, in which.

DETAILED DESCRIPTION OF THE INVENTION

Figure 1A:
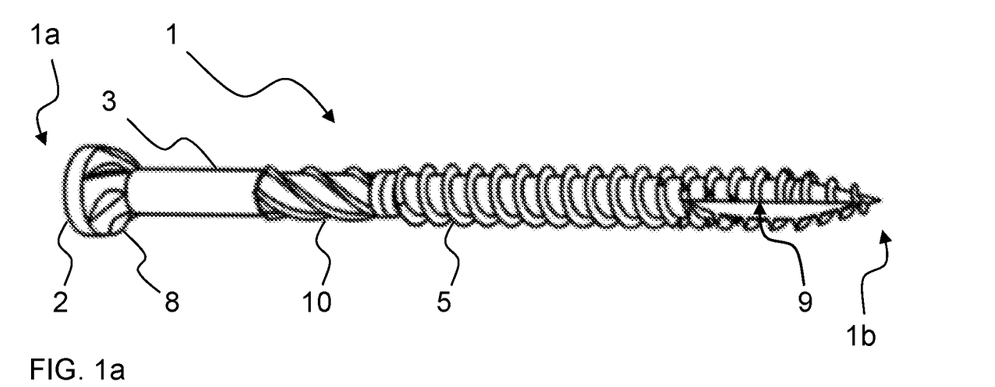
FIGS. 1a to 1f show an example of a screw, for which there is illustrated a) a perspective view, b) an upper side of the screw-head, c) an underside of the screw-head, d) an enlarged cross-section, e) a tapering angle of the screw-head and a skew angle of the inclination of the milling-rib, f) various cross-sections through the screw-head.

FIG. 1a illustrates a screw 1 in perspective side view. The screw 1 comprises a screw-head 2 at a first end 1a of the screw and a shank 3 extending from the screw-head 2 towards an opposite, second end 1b of the screw 1. A thread 5 is provided on the shank 3 for screwing the screw 1 into a material by a fastening-tool.

Figure 1B:
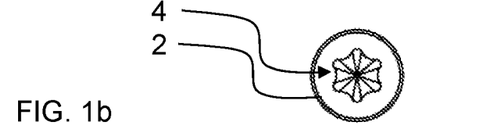

As better shown in FIG. 1b, which is a head-on view, the screw-head 2 comprises a tool-receiver 4, for example a Hexalobular (Torx®) socket or a cross socket, for engagement with a fastening-tool for screwing of the screw 1.

Figure 1C:
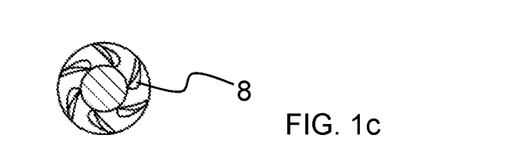

As best seen in FIG. 1c, which is a cross-sectional view onto the underside of the screw-head 2, a plurality of milling-ribs 8 are provided on the tapered surface 7. The milling-ribs 8 are inclined for inward-pressing of the material towards the shank 3 during countersinking of the screw-head 2.

A typical number of milling-ribs are 3-8, for example the exemplified 6 milling-ribs. For example, the milling-ribs 8 are arranged with identical mutual angular distance. In the present case with 6 milling-ribs, the angular distance is 60°.

Figure 1D:
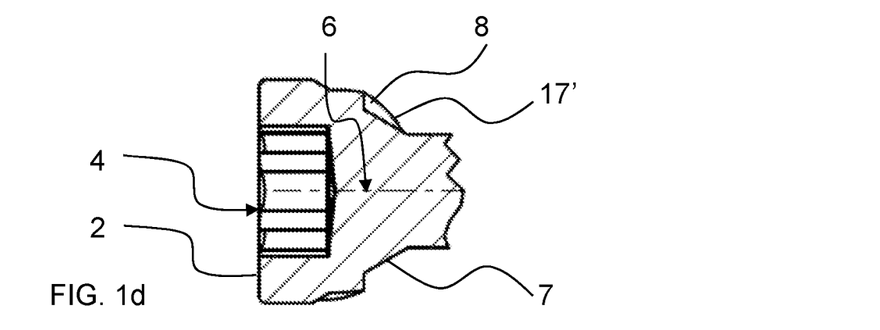
Figure 1E:
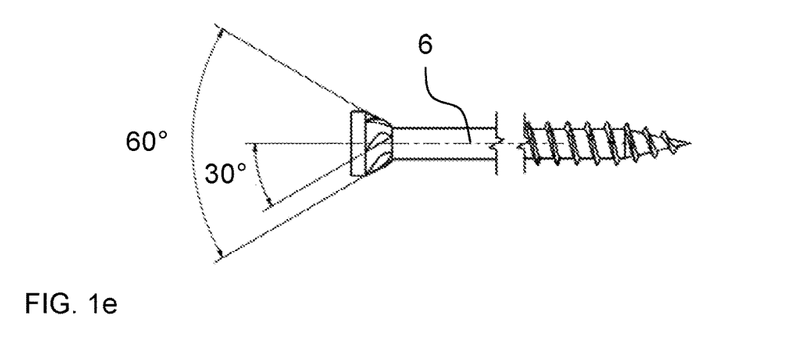

As better seen in FIG. 1d, which is an enlarged cross-section of the screw-head 2, the screw-head 2 has a tapered surface 7, exemplified as frusto-conical, towards the shank 3. The tapered surface 7 has a taper-direction towards the shank 3, wherein the taper-direction is within a plane that contains the central axis 6. As illustrated in FIG. 1e, the full angle spanned by the tapered surface is 60° when projected onto the plane of the drawing, which plane also contains the central axis 6. This implies that the angle of the taper-direction relatively to the central axis 6 is 30° when measured within the plane that contains the central axis 6. Typically, this angle of the taper-direction is within the range of 20-60°.

In order for the screw 1 to cut its way easier into the material, the screw 1 optionally comprises a cutting-edge 9 in the thread 5, as illustrated in FIG. 1a. The cutting-edge 9 extends along the shaft 3 and is exemplified in FIG. 1a as a notch extending over 7 windings of the thread and with sharp edges. The notch could extend over fewer or more windings.

As a further optional feature, the screw 1 is exemplified with a knurled shoulder 10 to reduce drag when the screw 1 is driven into the material, for example wood. The knurled shoulder 10 has an outer diameter larger than the diameter of the shank 3 near the screw-head 2 in order to create a hole wider than the shank 3. Typically, the knurled shoulder 10 is provided in immediate extension of the thread 5.

Figure 1F:
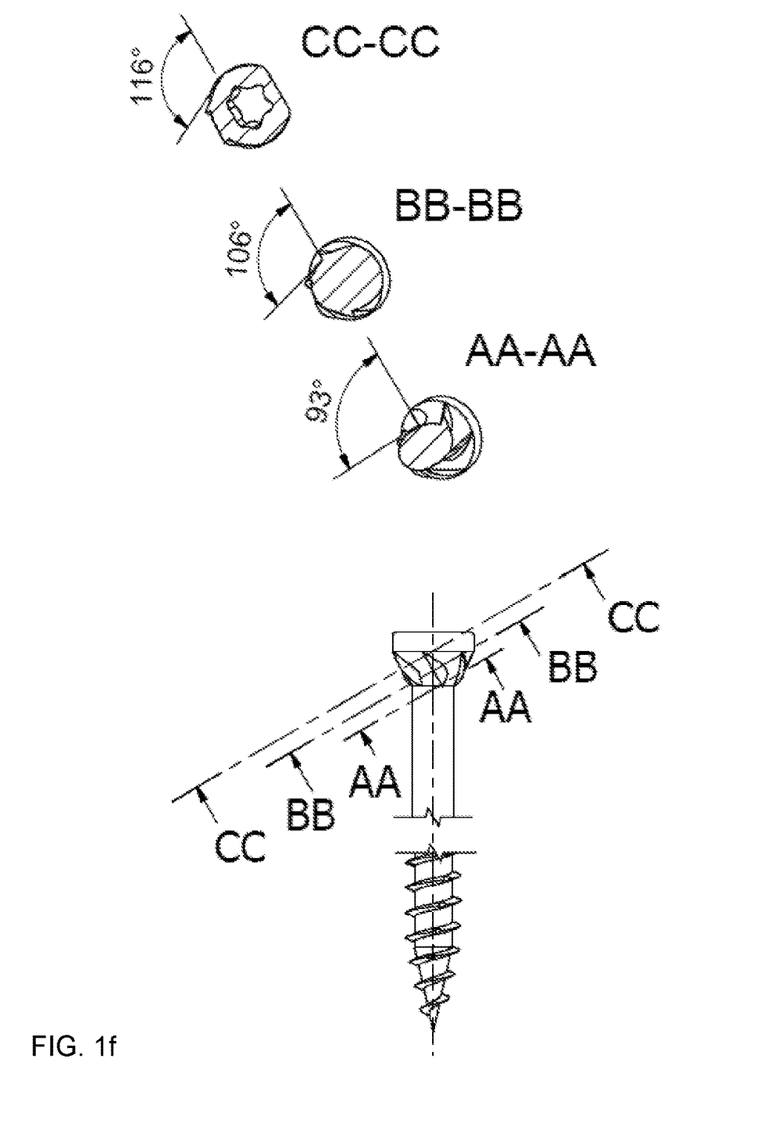

FIG. if illustrates various cross-sections perpendicular to the planer front-side 15, where the cross-sections are taken through the center of the front-side 15 and at the two opposite ends of the milling-rib. The angle varies due to the skew angle of the milling-rib, resulting in the planar front-side having varying angles with the tapered surface from one end of the front-side to the opposite end.

Figure 2A:
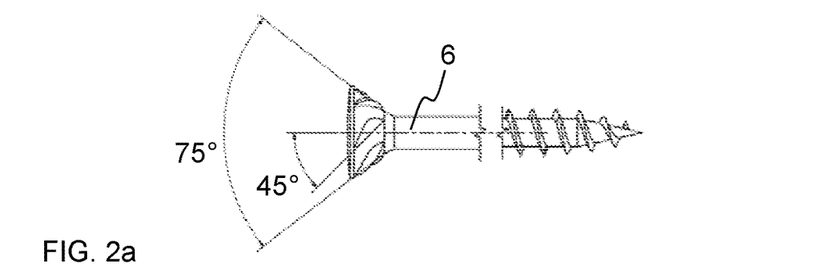
FIGS. 2a to 2d show an example of a screw different from the screw in FIG. 1, for which there is illustrated a) a tapering angle of the screw-head and a skew angle of the inclination of the milling-rib, b) various cross-sections through the screw-head, c) is an enlarged side view of a screw-head in another embodiment, d) a perspective view of a screw-head.
Figure 2B:
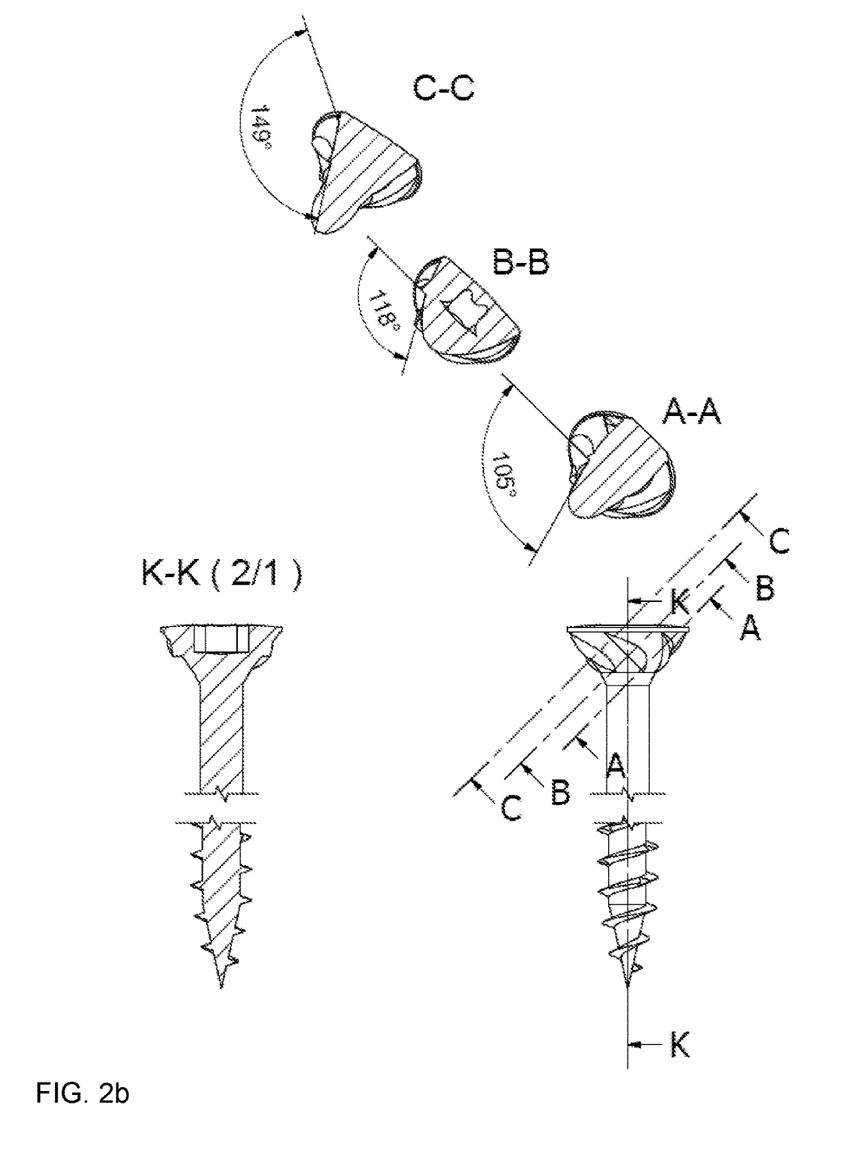
Figure 2C:
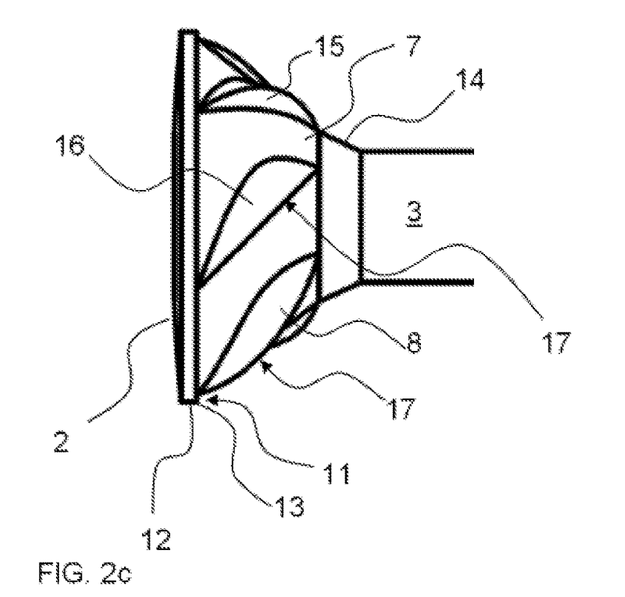
Figure 2D:
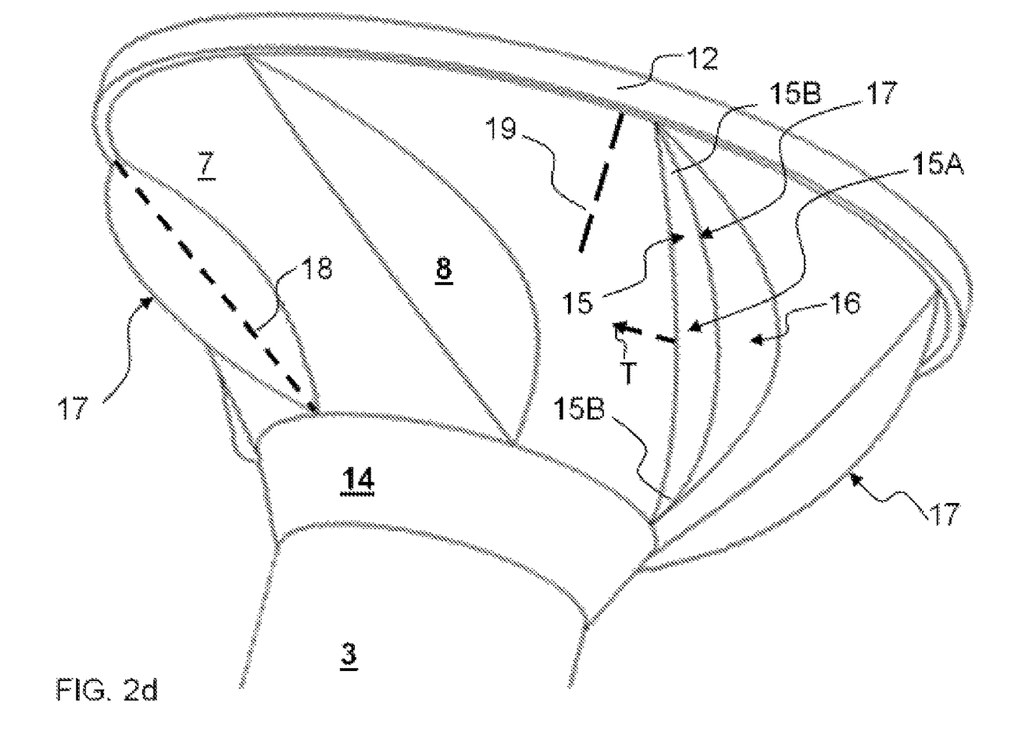

FIG. 2c and FIG. 2d illustrate an alternative embodiment of a screw 1 in greater detail. The tapered surface 7 is also in this case provided with a plurality of milling-ribs 8, each milling-rib 8 comprising a planar front-side 15 with a milling-edge 17 for milling material during countersinking of the screw-head 2. The planar front-side 15 is inclined relatively to the taper-direction 19, wherein the inclination of the front-side 15 and the milling-edge 17 are oriented for inward-pressing of the material towards the shank 3 during countersinking of the screw-head 2.

As also shown, the planar front-side 15 is delimited by the milling-edge 17 which is smoothly and continuously convex curving between opposite ends 15B of the front-side 15 for varying width of the front-side 15. The width is narrowest at the ends 15B, for example converging to zero, as exemplified in FIG. 2d. As also exemplified, the front-side 15 is widest at the center 15A of the front-side 15, although, this is not strictly necessary.

As best seen in FIG. 2c, a flat edge 11 is provided at the rim 12 of the underside of the screw-head 1, which is the side opposite the upper side with the tool-receiver. The flat edge 11 at the rim 12 acts as a cutting-edge 13 when the screw-head 2 is countersunk, for the example into wood, where the cutting-edge 13 cuts-off the wood fibers which creates a neatly cut edge of the countersunk hole for the screw-head 1. As an optional feature, the screw in FIG. 2 is exemplified with a frusto-conical transition region 14 between the shank 3 and the tapered surface 7.

As illustrated in FIG. 2a, the tapered surface in this embodiment is frusto-conical and spans in total 75°, thus, it has an angle of 37.5° with the central axis. The skew angle is 45° when projected onto a plane that is perpendicular to the planar front-side and parallel with the central axis of the screw.

The milling-ribs 8 are shown in greater detail in FIG. 2d. The curved convex milling-edge 17 is clearly seen. The back side 16 is not planar but is curved along a longitudinal direction 18 of the milling-rib 8 due to the convex milling-edge 17.

The curved milling-edges 17 are optionally arranged such that a rotation of the screw 1 with the curved milling-edges 17 results in a rounded shape of the removed part of the material by the curved milling-edges 17. For example, the hole milled by the milling-ribs 8 and drilled by the screw 1 appears hemispherical, such as illustrated in FIG. 5e. The part-spherical shape is also illustrated in FIG. 1d, where a projection 17' of the milling-rib 8 follows a section of a circle.

Figure 5A:
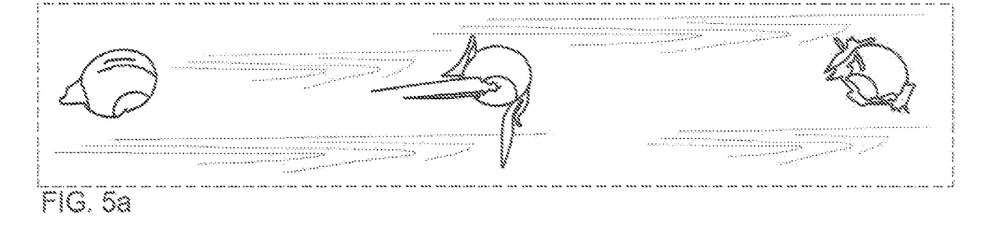
FIGS. 5a to 5g show photos of countersinking of screws in comparison, where a) illustrates three holes from countersinking, b) and c) illustrate the edges of a hole by a prior art countersunk screw, and d) by a countersunk screw as described herein; wherein e) illustrates enlarged the left hole of FIG. 5a; wherein f) shows a photo with compacted wood fibers on the underside of the screw-head between the milling-ribs, and g) is a drawn illustration of the compacting principle.
Figure 5B:
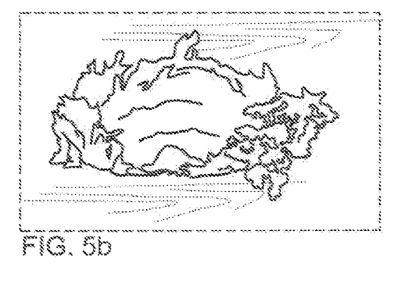
Figure 5C:
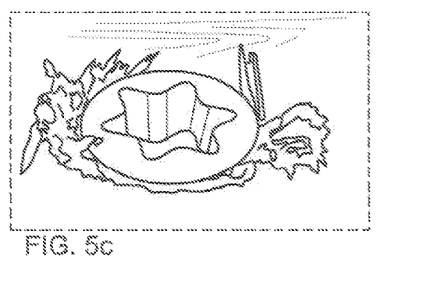
Figure 5D:
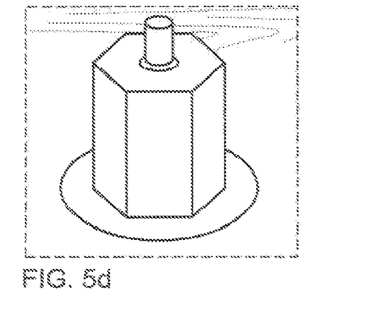
Figure 5E:
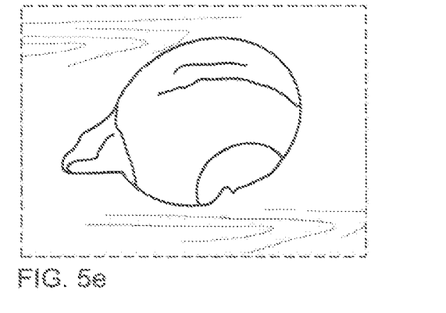
Figures 5F, 5G, 6A, 6B:
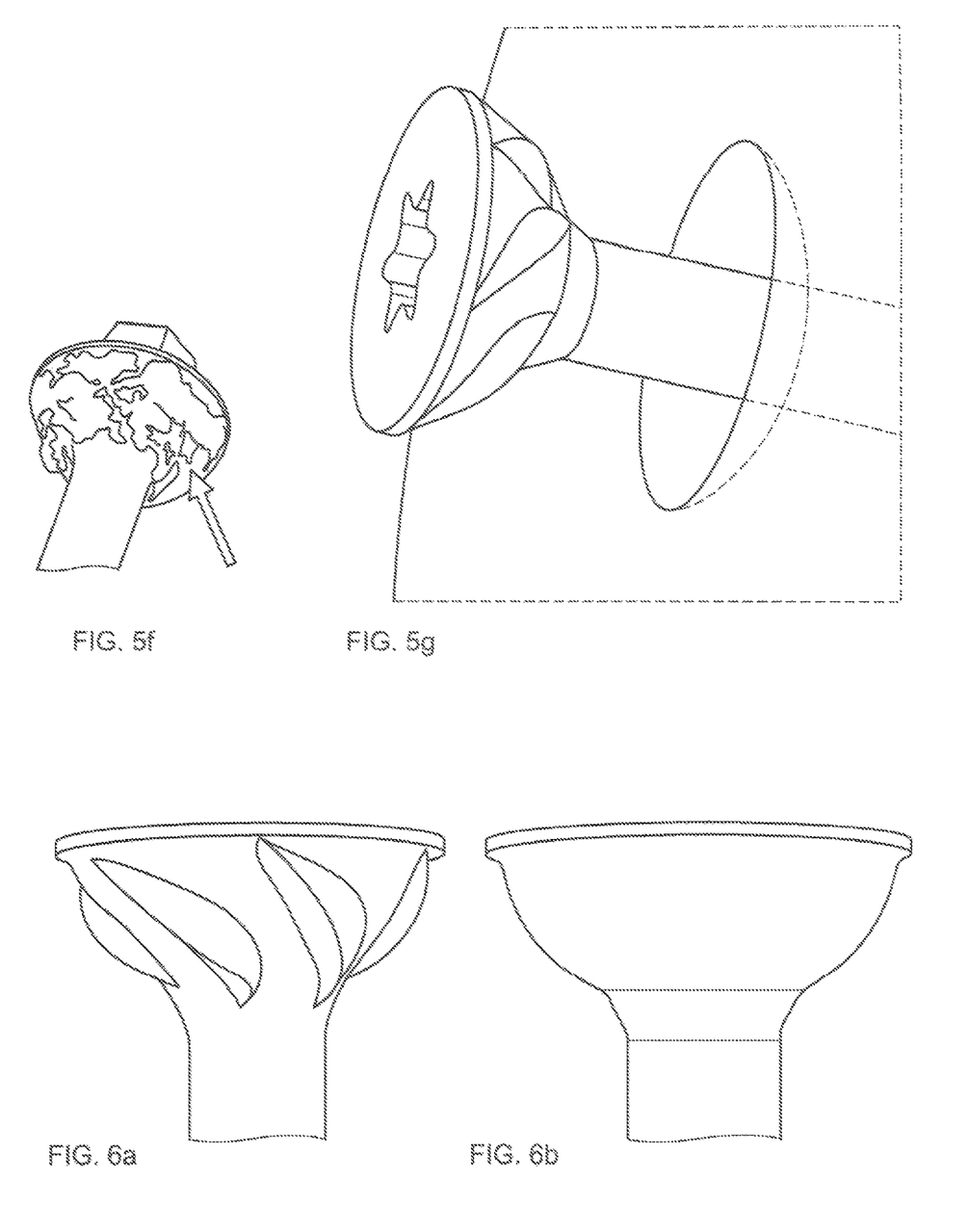
FIGS. 6a and 6b show a prototype screw-head a) in still condition and b) during rotation of the screw, illustrating the hemi-spherical milling shape that the hole would attain.

From a prototype screw, the head of which is illustrated in FIG. 6a, the partly spherical milling shape during rotation has been illustrated in FIG. 6b, which is a photo of the quickly rotating screw-head. The hemispherical shape is not essential, but a rounded shape of the hole due to the curved milling-edges 17 of the milling-ribs 8 has been found as being a good technical solution, resulting in clean counter-sinking of the screw, especially in wood.

Figure 3A:
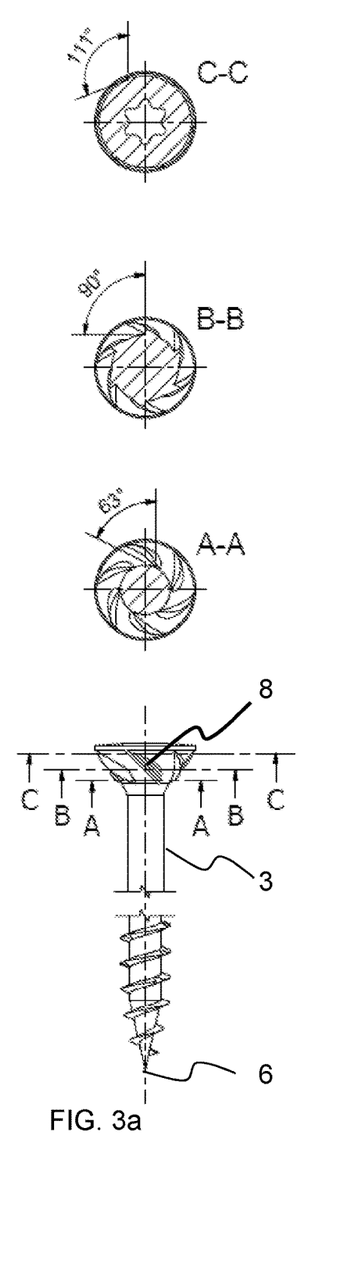
FIGS. 3a to 3c illustrate a screw in three versions, wherein the center of the flat front-side of the milling-rib is a) aligned with the central axis, b) to the right of the central axis, and c) to the left of the central axis.
Figure 3B:
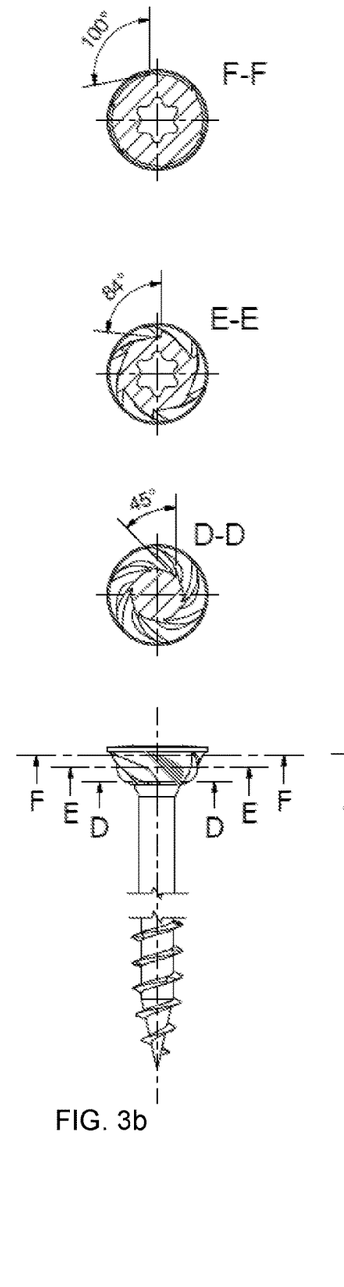
Figure 3C:
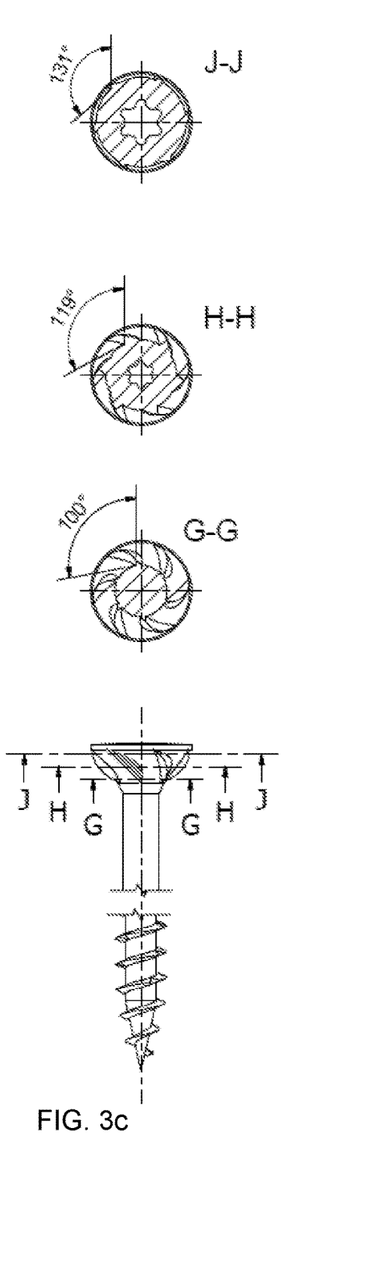

FIGS. 3a, 3b, and 3c illustrates various planar cross-sections perpendicular to the central axis 6 of the screw. One of the milling-ribs in each of the three screws is blackened. Each of the three blackened milling-ribs is arranged with its planar front-side perpendicular to the plane of the drawing. However, in FIG. 3a, the middle of the milling-rib is aligned with the central axis. In FIG. 3b, the milling-rib is arranged to the right of the center-axis, and in FIG. 3c, the milling-rib is arranged to the left of the central axis. In the cross-sections B-B, E-E, H-H, respectively, an angle is indicated for the center of the front-side. This angle is measured between the center of the planar front-side 15 of the milling-rib 8 and the direction of movement of the planar front-side 15 during screwing, which is a direction T tangential to the shank. In FIG. 3a, this angle is 90°, which is due to the fact that the middle of the front side, when viewed in parallel to the planar front-side, coincides with the central axis. However, when the milling-rib is arranged as in FIG. 3b or FIG. 3c, which is to the right or left, respectively, relatively to the central axis, the angle is respectively smaller or larger. The arrangement of the milling-rib as shown in FIG. 3a is regarded as best.

FIG. 4 illustrates alternative embodiments of screws. FIG. 4a, illustrates a screw in different perspectives with a collar 13' at the rim of the screw-head, where the collar 13' projects outwards from the flat region 11 on the underside of the screw-head towards the second end of the screw. The circular projecting collar 13' functions as cutting edge during countersinking of the screw. FIG. 4b is similar to the screw in FIG. 4a, however, the collar 13" in this embodiment is toothed for more efficient cutting.

Figure 4A:
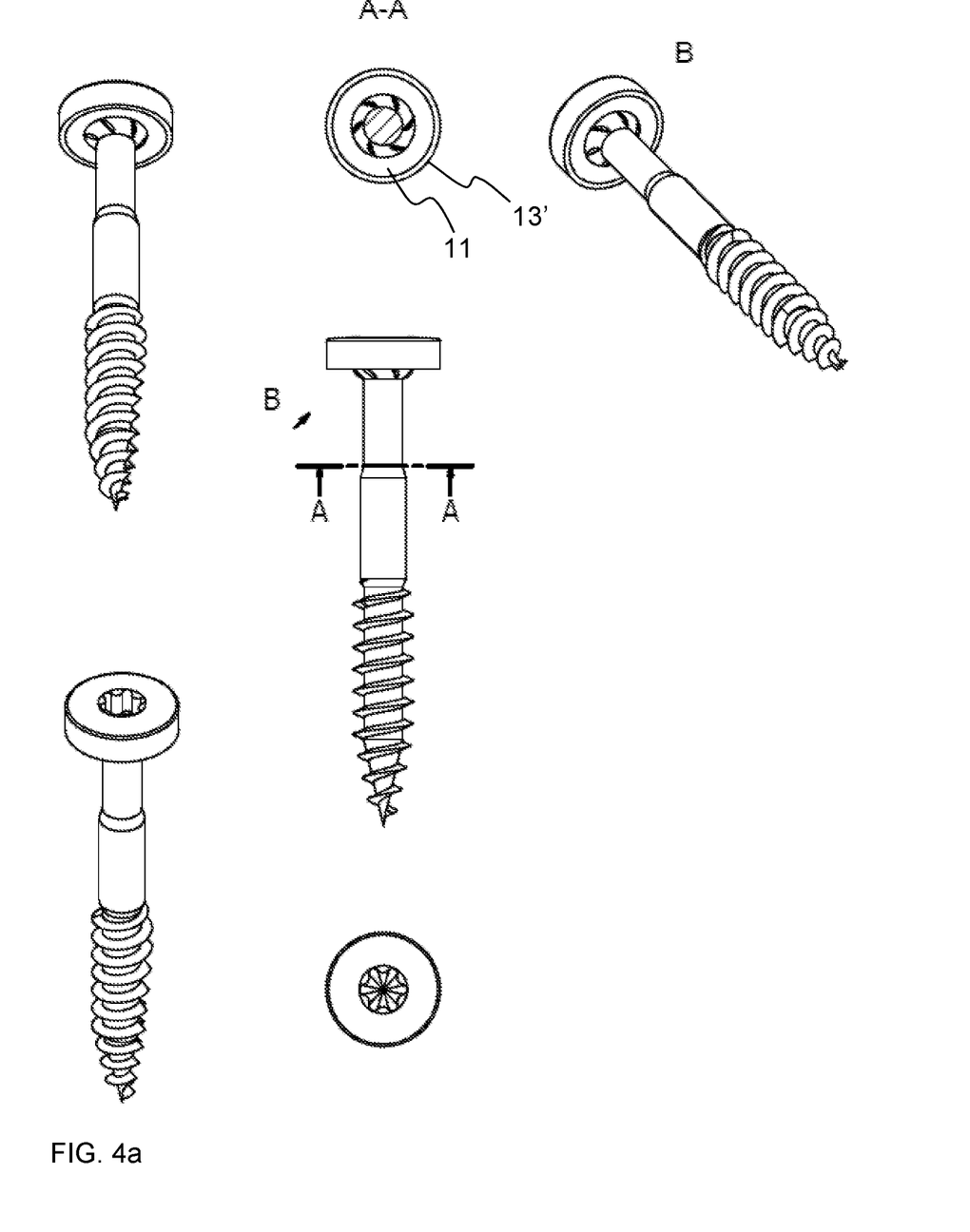
FIGS. 4a to 4e illustrate alternative embodiments of screws, wherein a) is a screw with a collar at the rim of the screw-head, b) with a toothed collar at the rim of the screw-head, c) with a second set of milling ribs on the flat edge on the underside of the screw-head, d) with a drill point of the second end, and e) with a curved taper under the screw-head.
Figure 4B:
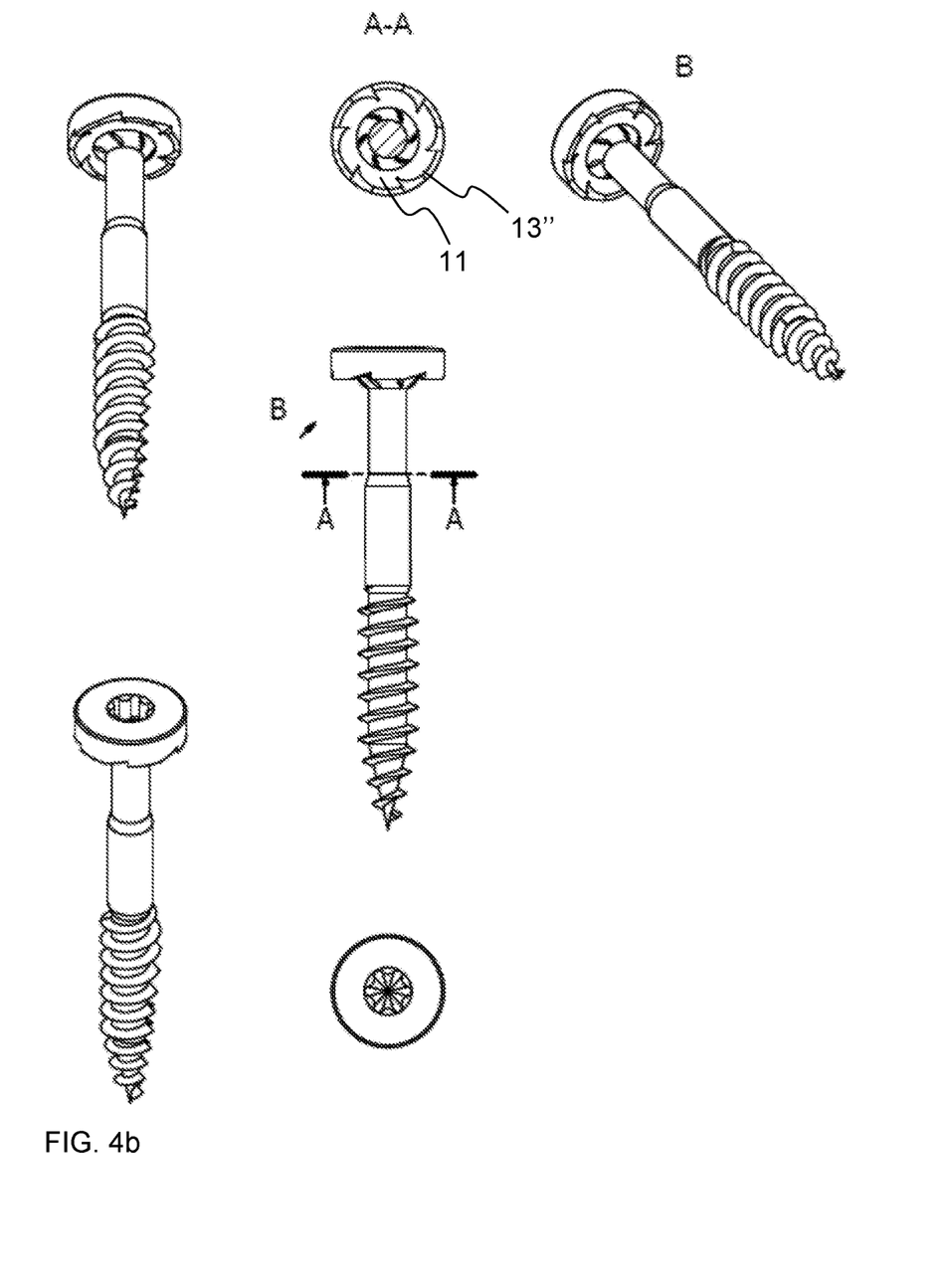
Figure 4C:
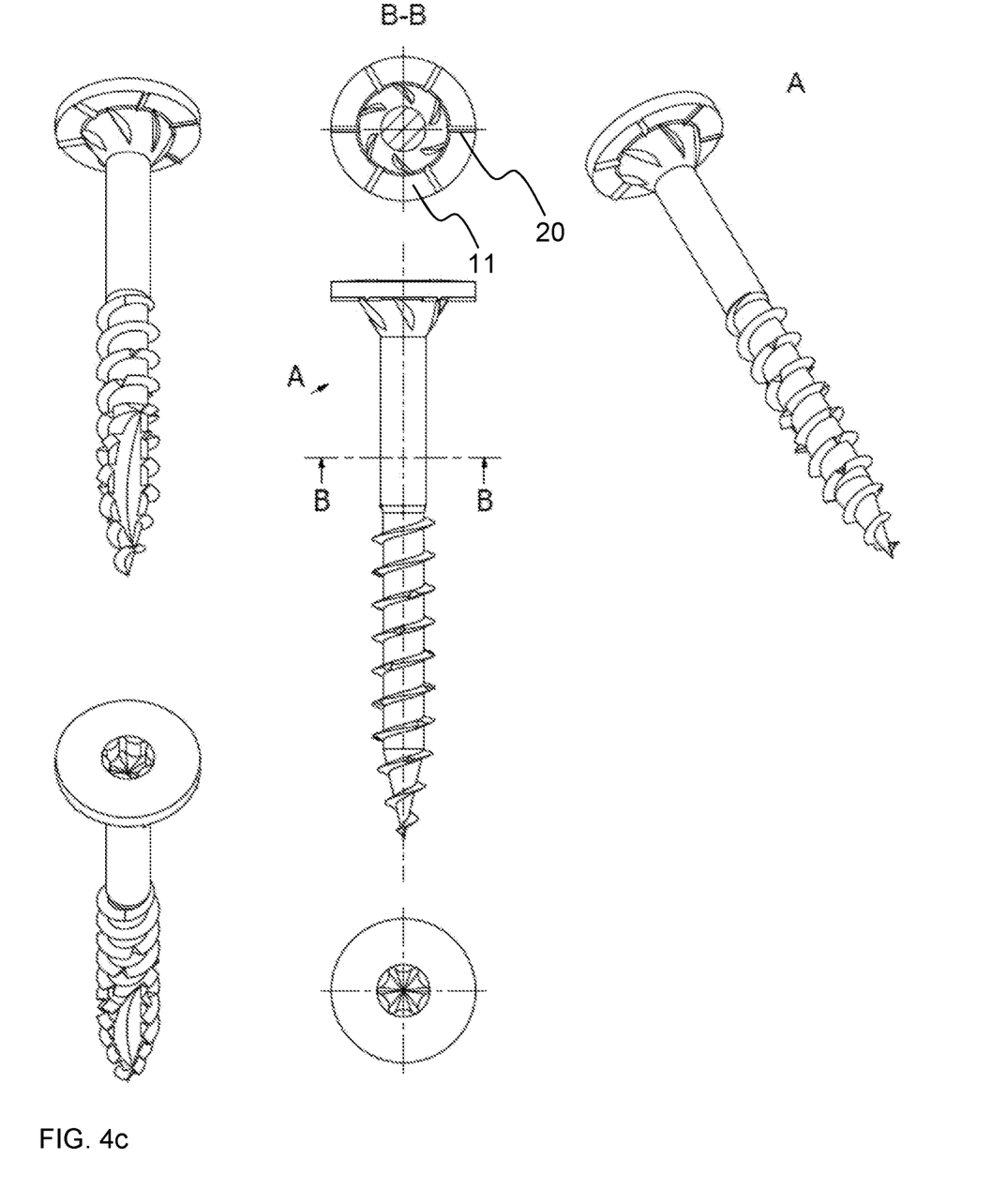

FIG. 4c illustrates a screw with a second set of milling ribs 20 on the flat edge 11 on the underside of the screw-head. These milling ribs 20 extend in a radial direction.

Figure 4D:
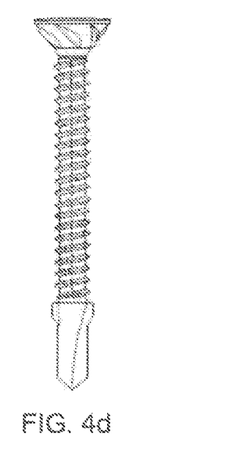

FIG. 4d illustrates a screw with a drill point at the second end and a thread that extends from the drill point to the screw-head.

Figure 4E:
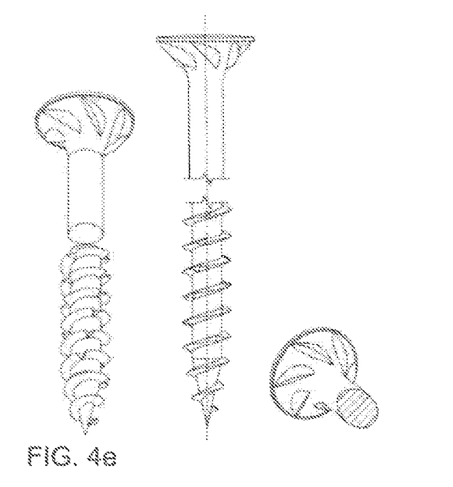

FIG. 4e illustrates a screw in which the underside of the screw-head is not frusto-conical but tapering along a smooth concave curve. Nevertheless, due to the milling-ribs, the countersunk hole will have an approximate hemispherical shape.

FIG. 5a shows photos of a screw hole made with a screw according to the invention as compared to screw holes with other screws having milling-ribs underneath the screw-head. The left-most hole has been drilled with a screw as described herein, whereas the other two holes have been made with other screws having other types of milling-ribs. As can be observed in FIG. 5e, showing the left hole of FIG. 5a enlarged, the milled hole in the wood appears hemispherical, where the milled part follows a part of a sphere.

FIG. 5d shows the head of a screw, as described herein, countersunk into wood, where for experimental reasons, the head was provided with a hexagon. It is observed that the hole is neatly round around the head. In comparison, conventional screws with milling-ribs under the head produced wooden fringes around the holes, as illustrated in FIG. 5b and FIG. 5c.

During the countersinking of this screw, the inward-pressing orientation of the milling-ribs resulted in a compaction of the wood fibers in between the milling-ribs. This is shown in the photo of FIG. 5f, where the arrow points to the compacted wood fibers. An illustration is shown in FIG. 5g, where the narrow black arrow points to the region for the compacted wood fibers on the tapered underside of the screw-head and the thick white arrow points on the hemispherical countersunk hole.

The invention claimed is:

1. A screw (1) comprising a screw-head (2) at a first end (1a) of the screw (1) and a shank (3) extending from the screw-head (2) towards an opposite, second end (1b) of the screw (1) where a thread (5) is provided on the shank (3) for screwing the screw (1) into a material by a fastening-tool; wherein the screw (1) has a longitudinal central axis (6) extending between the first end (1a) and the second end (1b); wherein the screw-head (1) has an upper side and an underside, wherein the upper side comprises a tool-receiver (4) for engagement with the fastening-tool; wherein the underside of the screw-head (2) comprises a tapered surface (7) with a taper-direction (19) towards the shank (3), the taper-direction being in a plane that contains the central axis (6); the tapered surface (7) being provided with a plurality of milling-ribs (8), each milling-rib (8) comprising a planar front-side (15) that is oriented towards a milling direction and delimited by a milling-edge (17) for milling material during countersinking of the screw-head (2); wherein the front-side (15) is inclined relatively to the taper-direction (19), wherein the inclination of the front-side (15) and the milling-edge (17) are oriented for inward-pressing of milled material towards the shank (3) during countersinking of the screw-head (2) in the material; wherein the milling-ribs (8) are protruding from the tapered surface (7) and the milling-edge (17) is smoothly and continuously convex curving between opposite ends (15B) of the front-side (15) for varying width of the front-side (15), the width of the front-side (15) being narrowest at the ends (15B) for providing a rounded shape of the hole during countersinking.

2. A screw according to claim 1, wherein the width of the front-side (15) is widest at a center (15A) of the front-side (15) and smoothly and continuously decreasing from the center (15A) towards the opposite ends (15B).

3. A screw according to claim 2, wherein the milling-edge (17), when projected onto a plane through the central axis (6) and through the center (15A) of the flat surface (15), follows a section (17') of a circle for milling a hemispherical hole for the screw-head (2) during countersinking.

4. A screw according to claim 1, wherein the front-side (15) has opposite ends (15B) and a center (15A) spaced in the middle between the opposite end parts (15B), wherein the center (15A) forms an approximate right angle within a range of 88° to 92° with the tapering surface (7) in a plane perpendicular to the central axis (6) and through the center (15A) of the flat surface (15).

5. A screw according to claim 4, wherein the center (15A) is aligned with the central axis (6) when viewed along the planar front-side (15) in a direction perpendicular to the central axis (6).

6. A screw according to claim 1, wherein each milling-rib (8) also has a back side (16), and wherein the back side (16) has a larger angle with the tapering surface (7) than the front-side (15).

7. A screw according to claim 1, wherein a flat edge (11) is formed on an underside of the screw-head (2) along a rim (12) of the screw-head (2), the flat edge (11) connecting the rim (12) with the tapered surface (7), the flat edge (11) having a surface in a plane perpendicular to the central axis (6).

8. A screw according to claim 7, wherein the width of the flat edge is between 1% and 25% of the diameter of the screw-head (2).

9. Use of a screw according to claim 1 by screwing into wood with the fastening tool in a tool receiver in the screw-head while milling the wood with the milling ribs attached to the screw-head and countersinking the screw-head into the wood.

10. A method for clean countersinking of a screw with minimal wooden fringes around the countersunk screw, the method comprising providing a screw (1) according to claim 1 and driving the screw (1) into a piece of wood until the screw-head (2) is countersunk into the wood, wherein the method comprises forming a rounded countersunk hole by the screw.

* * * * *